US009452743B2

United States Patent
Azzi et al.

(10) Patent No.: US 9,452,743 B2
(45) Date of Patent: Sep. 27, 2016

(54) BRAKING METHOD AND SYSTEM FOR A HYBRID OR ELECTRICALLY POWERED MOTOR VEHICLE

(75) Inventors: Hamid Azzi, Maurepas (FR); Richard Pothin, Jouars-Pontchartrain (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 194 days.

(21) Appl. No.: 13/880,435

(22) PCT Filed: Oct. 19, 2011

(86) PCT No.: PCT/FR2011/052440
§ 371 (c)(1),
(2), (4) Date: Jul. 1, 2013

(87) PCT Pub. No.: WO2012/052682
PCT Pub. Date: Apr. 26, 2012

(65) Prior Publication Data
US 2013/0282250 A1  Oct. 24, 2013

(30) Foreign Application Priority Data

Oct. 19, 2010  (FR) .................................. 10 58539

(51) Int. Cl.
*B60T 8/172* (2006.01)
*B60T 1/10* (2006.01)
(Continued)

(52) U.S. Cl.
CPC .................. *B60T 8/172* (2013.01); *B60T 1/10* (2013.01); *B60T 8/1755* (2013.01); *B60W 10/08* (2013.01);
(Continued)

(58) Field of Classification Search
CPC ......... B60W 30/18127; B60W 10/08; B60W 2710/18; B60T 2270/304
See application file for complete search history.

(56) References Cited

U.S. PATENT DOCUMENTS 6,007,160 A * 12/1999 Lubbers .................. B60T 7/042
                                                188/358
6,050,653 A *  4/2000 Wachi ..................... B60T 7/042
                                                303/113.4
(Continued)

FOREIGN PATENT DOCUMENTS

DE    10 2007 056359      5/2009
DE    10 2008 001455     11/2009
WO       2009 077835      6/2009

OTHER PUBLICATIONS

French Search Report Issued May 20, 2011 in French Patent Application No. 10 58539 Filed Oct. 19, 2010.
(Continued)

*Primary Examiner* — Mussa A Shaawat
(74) *Attorney, Agent, or Firm* — Oblon, McClelland, Maier & Neustadt, L.L.P.

(57) ABSTRACT

A braking method for a motor vehicle including a hybrid or electric propulsion system, a hydraulic braking system, an electric braking system recuperating electrical energy, a brake pedal, systems to assist with driving of the vehicle, and a vehicle electronic stability control system. The method includes: selecting one of torque setpoints from between a pedal torque setpoint relating to position of or force supplied to the brake pedal, and a torque setpoint relating to the driver assistance systems; formulating a hydraulic braking torque setpoint independent of a state of the pedal by the electric or hybrid propulsion system; acquiring information relating to stability of the vehicle; formulating a hydraulic braking torque setpoint and an electric braking torque setpoint intended for the hybrid or electric propulsion system based on the selected torque setpoint, the independent hydraulic braking torque setpoint, and the information relating to the vehicle stability.

8 Claims, 1 Drawing Sheet

(51) Int. Cl.
*B60T 8/1755* (2006.01)
*B60W 10/08* (2006.01)
*B60W 10/188* (2012.01)
*B60W 30/18* (2012.01)

(52) U.S. Cl.
CPC ...... *B60W 10/188* (2013.01); *B60W 30/18127* (2013.01); *B60T 2260/09* (2013.01); *B60T 2270/304* (2013.01); *B60T 2270/604* (2013.01); *B60T 2270/613* (2013.01); *B60W 2710/18* (2013.01); *Y10S 903/947* (2013.01)

(56) References Cited

U.S. PATENT DOCUMENTS

| | | | | |
|---|---|---|---|---|
| 6,234,585 | B1* | 5/2001 | Harris | B60T 7/042 |
| | | | | 303/113.4 |
| 6,508,523 | B2* | 1/2003 | Yoshino | B60K 6/48 |
| | | | | 303/152 |
| 7,610,974 | B2* | 11/2009 | Abe | B60K 6/445 |
| | | | | 180/65.21 |
| 2003/0182044 | A1* | 9/2003 | Nakamura | B60T 8/00 |
| | | | | 701/70 |
| 2005/0269875 | A1* | 12/2005 | Maki | B60L 7/26 |
| | | | | 303/152 |
| 2007/0228821 | A1* | 10/2007 | Maki | B60K 6/445 |
| | | | | 303/151 |
| 2009/0105919 | A1* | 4/2009 | Karnjate | B60T 8/172 |
| | | | | 701/70 |
| 2009/0198428 | A1* | 8/2009 | Vourch | B60T 8/3275 |
| | | | | 701/91 |
| 2010/0036577 | A1* | 2/2010 | Kodama | B60K 7/26 |
| | | | | 701/76 |
| 2010/0094511 | A1 | 4/2010 | Krueger et al. | |
| 2010/0270854 | A1* | 10/2010 | Okano | B60T 1/10 |
| | | | | 303/3 |
| 2010/0292882 | A1 | 11/2010 | Murata | |
| 2010/0299036 | A1* | 11/2010 | Vespasien | B60L 7/18 |
| | | | | 701/70 |
| 2011/0040465 | A1* | 2/2011 | Suda | B60T 8/3275 |
| | | | | 701/70 |
| 2013/0020859 | A1* | 1/2013 | Maki | B60K 6/445 |
| | | | | 303/3 |
| 2013/0062932 | A1* | 3/2013 | Yagashira | B60T 8/442 |
| | | | | 303/3 |
| 2013/0204502 | A1* | 8/2013 | Biller | B60L 7/18 |
| | | | | 701/70 |

OTHER PUBLICATIONS

International Search Report Issued Feb. 13, 2012 in PCT/FR11/52440 Filed Oct. 19, 2011.

* cited by examiner

BRAKING METHOD AND SYSTEM FOR A HYBRID OR ELECTRICALLY POWERED MOTOR VEHICLE

BACKGROUND

The invention relates to a braking method and system for electrically powered or hybrid motor vehicles, and more particularly to decoupled braking methods and systems for electrically powered or hybrid motor vehicles.

The expression "decoupled braking" means braking without any direct mechanical link between the brake pedal and the braking device.

By contrast with a conventional braking system, therefore, a decoupled braking system allows the driver's action on the brake pedal to be dissociated from the deceleration that actually takes place.

Additionally, in an electrically powered or hybrid vehicle, braking can be provided by a brake actuator, such as a hydraulic actuator, or by an electric propulsion actuator which, in regenerative mode, enables electrical energy to be recovered, this energy being storable in batteries, thus increasing the range of the electrically powered or hybrid vehicle.

Furthermore, there are known devices for controlling the stability of motor vehicles.

However, regenerative braking may lead to stability problems for the vehicle, notably in emergency braking. There are also known motor vehicle stability modules, such as those disclosed in KR20090043 126 and US200260220453, in which the energy recovery function is deactivated solely in circumstances of antilock braking control (ABS).

WO200837347 describes a stability module which deactivates the energy recovery function in accordance with an electronic vehicle stability control system.

Reference may also be made to EP2055589 which describes an energy recovery method which does not take the stability of the vehicle into account.

There has also been a proposal, in US20050200197, to calculate the braking torque, within a system operating in open loop mode and using predetermined curves.

U.S. Pat. No. 6,155,365 describes a theoretical braking method which does not take the stability of the vehicle into account.

BRIEF SUMMARY

In view of the above, the object of the present invention is to overcome at least some of the drawbacks of the prior art, and, in particular, to enable the stability, the energy recovery and the braking of a motor vehicle to be controlled.

According to a first aspect, what is proposed is therefore a method of braking a motor vehicle fitted with an electric or hybrid propulsion system, and including a hydraulic braking system, an electric braking system allowing the recovery of electrical energy, a brake pedal, vehicle driver assistance systems, and an electronic vehicle stability control system.

The method comprises the following steps:
selection of one torque setpoint from between a brake pedal torque setpoint relating to the position or the force exerted on the brake pedal and a torque setpoint relating to the driver assistance systems,
formulation of a hydraulic braking torque setpoint, independent of the state of the pedal, by means of the electric or hybrid propulsion system,
acquisition of data relating to the stability of the vehicle,
formulation of a hydraulic braking torque setpoint and an electric braking torque setpoint intended for the electric or hybrid propulsion system, on the basis of the selected torque setpoint, the independent hydraulic braking torque setpoint and the data relating to the stability of the vehicle.

Thus the method formulates hydraulic braking torque setpoints and electric braking torque setpoints in order to control the stability of the vehicle, the energy recovery and the braking of the vehicle.

Advantageously, an emergency braking setpoint is formulated, this setpoint being intended for the electronic vehicle stability control system, on the basis of the data relating to the position or the force exerted on the brake pedal.

Additionally, the selection of one torque setpoint from between the brake pedal torque setpoint and the torque setpoint relating to the driver assistance systems comprises the selection of the higher setpoint value.

According to another aspect, what is proposed is a motor vehicle comprising an electric or hybrid propulsion system, a hydraulic braking system, an electric braking system allowing the recovery of electrical energy, a brake pedal, vehicle driver assistance systems, an electronic vehicle stability control system, and an electronic control unit.

The electronic control unit comprises:
means for selecting one torque setpoint from between a brake pedal torque setpoint relating to the position or the force exerted on the brake pedal and a torque setpoint relating to the driver assistance systems,
means for formulating a hydraulic braking torque setpoint, independent of the state of the pedal, using the electric or hybrid propulsion system,
means for acquiring data relating to the stability of the vehicle,
means for formulating a hydraulic braking torque setpoint and an electric braking torque setpoint intended for the electric or hybrid propulsion system, on the basis of the selected torque setpoint, the independent hydraulic braking torque setpoint and the data relating to the stability of the vehicle.

The electronic control unit may comprise means for formulating an emergency braking setpoint, intended for the electronic vehicle stability control system, on the basis of the data relating to the position or the force exerted on the brake pedal.

BRIEF DESCRIPTION OF THE DRAWINGS

Other advantages and characteristics of the invention will be revealed by the following description, provided solely by way of non-limiting example and illustrated by the attached drawings, in which.

DETAILED DESCRIPTION

Figure 1:
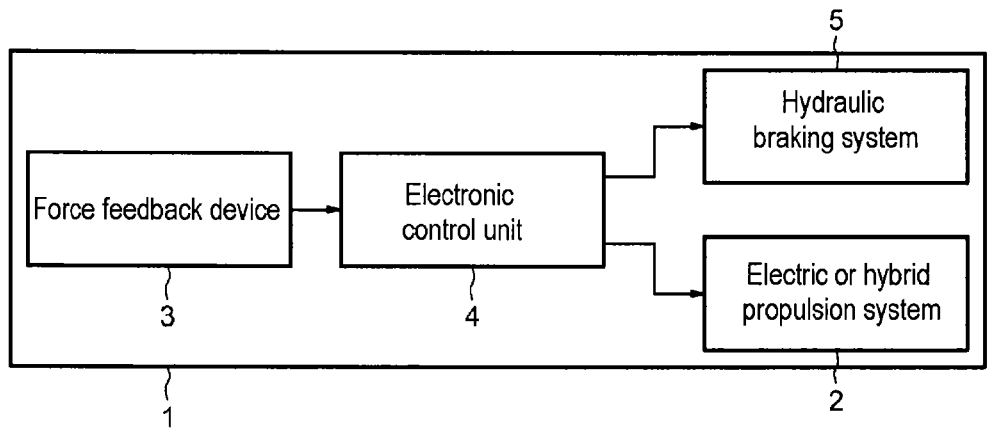
FIG. 1 is a schematic illustration of a decoupled braking system.

FIG. 1 provides a schematic representation of a motor vehicle 1, which comprises an electric or hybrid propulsion system 2 adapted to recover electrical energy during electric braking.

The motor vehicle 1 is also fitted with a brake pedal, which is connected to a force feedback device 3 adapted to collect data relating to the position or to the force exerted on the pedal by the driver. The feedback device 3 converts the data received by it to electrical signals.

The force feedback device 3 is connected to an electronic control unit 4 which enables braking setpoints to be formulated for the hydraulic braking system 5 which is fitted with actuators, and for the electric or hybrid propulsion system 2.

The vehicle 1 further comprises an electronic vehicle stability control system.

Figure 2:
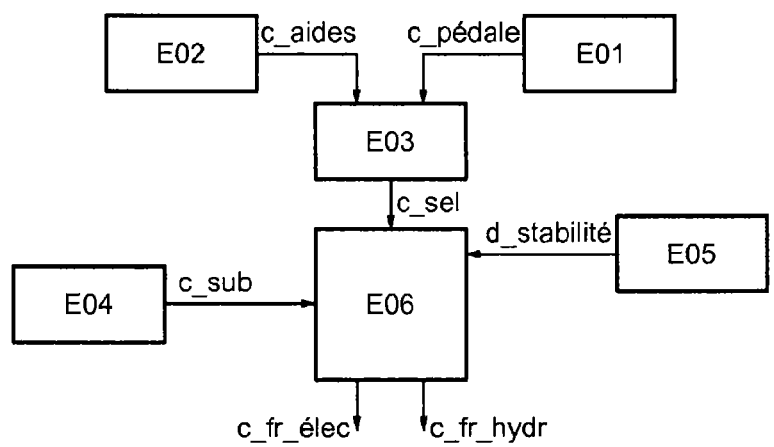
FIG. 2 shows the various steps of a braking method according to the invention.

FIG. 2 shows schematically the steps of a braking method in a motor vehicle 1 according to the invention.

A first step E01 for formulating a pedal torque setpoint c_pédale is executed on the basis of data relating to the brake pedal, such as its position or the force exerted by the driver on the pedal, these data being collected by the force feedback device 3. The setpoint c_pédale corresponds to an interpretation of the driver's wishes. This formulation may, for example, comprise a map of the torque as a function of the position of the brake pedal.

A step E02 of formulation of a torque setpoint relating to driver assistance systems c_aides is executed simultaneously with step E01. This setpoint is provided on the basis of a synthesis of the set of the torque setpoints generated by driver assistance systems such as an adaptive speed controller, for example.

The data received by the driver assistance systems can also be processed by means of filters.

The two setpoints c_pédale and c_aides are processed in a selection step E03 which supplies a setpoint c_sel. In this step, an arbitration procedure is executed between the two setpoints. For example, the higher setpoint value may be selected.

A step E04 of formulation of a hydraulic braking torque setpoint c_sub is also executed. The setpoint c_sub is independent of the state of the pedal, and is formulated by the electric or hybrid propulsion system. The setpoint c_sub corresponds to the amount of deceleration that cannot be provided by the electric or hybrid propulsion system, as a result of the intrinsic qualities of this system, and also as a function of the battery charge level. Thus, the setpoint c_sub can provide repeatable engine braking regardless of circumstances.

In addition to steps E01, E02, and E03, a step E05 is executed. This is a step of acquisition of data d_stabilité, relating to the stability of the vehicle 1. These data d_stabilité are obtained from an electronic vehicle stability control system. The data d_stabilité may, for example, be provided by a set of sensors adapted to evaluate the speed, longitudinal acceleration, lateral acceleration, and slip rate of the vehicle wheels. The stability data d_stabilité may also comprise data on an antilock control system for the brakes, or an automatic traction control system for the wheels.

The setpoints c_sel and c_sub and the data d_stabilité are then consolidated in step E06. This step corresponds to a distribution of the hydraulic and electric braking setpoints, in order to optimize the braking, allowing electrical energy recovery while maintaining the stability of the vehicle. This distribution can ensure that the requested braking torque is actually applied.

Thus this step E06 supplies a hydraulic braking setpoint c_fr_hyd intended for the hydraulic braking system 5 and a braking setpoint c_fr_elec intended for the electric motor which enables energy to be recovered.

Figure 3:
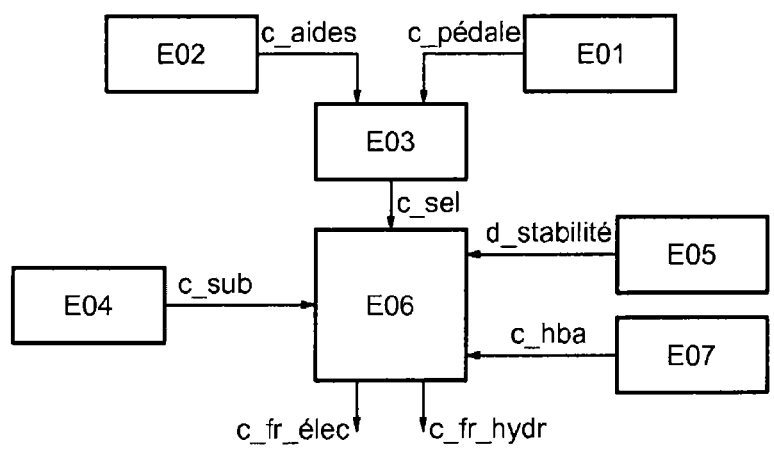
FIG. 3 shows the various steps of another embodiment of the invention.

FIG. 3 shows another embodiment of the invention. The steps and the setpoints having the same reference numerals are identical to those of FIG. 2.

A step E07 of formulation of an emergency braking setpoint c_hba has been added. This setpoint is then processed in step E06 which can supply a setpoint c_ fr_hyd corresponding to the emergency braking setpoint c_hba.

Steps E01-E07 may be executed within the electronic control unit 4.

It should be noted that the vehicle includes other elements which are omitted from the illustration for the sake of simplicity.

With the invention, the energy recovery during braking can be maximized, while the risks of vehicle instability are limited and effective braking is possible.

The use of the present invention means that the strategies for distributing braking between hydraulic and electric braking are not exclusively dependent on the electronic vehicle stability control system, the different sources of deceleration setpoints being managed within the same computer.

The invention claimed is:

1. A method of braking a motor vehicle including an electric or hybrid propulsion system, a hydraulic braking system, an electric braking system allowing recovery of electrical energy, a brake pedal, vehicle driver assistance systems, an electronic vehicle stability control system, and an emergency braking system, the method comprising:
    determining a pedal torque setpoint elating to a position of or a force exerted on the brake pedal;
    determining a torque setpoint from a plurality of torque setpoints generated by the driver assistance systems, the driver assistance systems including an adaptive speed controller that generates one of the plurality of torque setpoints;
    selecting one torque setpoint from between the pedal torque setpoint relating to a position of or a force exerted on the brake pedal and the torque setpoint relating to the driver assistance systems;
    formulating a hydraulic braking torque setpoint, independent of a state of the pedal, by the electric or hybrid propulsion system;
    acquiring data elating to stability of the vehicle from the electronic vehicle stability control system;
    formulating a hydraulic braking torque setpoint and an electric braking torque setpoint configured for the electric or hybrid propulsion system, on the basis of the selected torque setpoint, the independent hydraulic braking torque setpoint, and the data relating to the stability of the vehicle,
    wherein the driver assistance systems are separate from the electronic vehicle stability control system and the emergency braking system.

2. The method as claimed in claim 1, wherein emergency braking setpoint is formulated by the configured for the electronic vehicle stability control system, on the basis of the data relating to the position of or the force exerted on the brake pedal.

3. The method as claimed in claim 1, wherein the selecting one torque setpoint from between the brake pedal torque setpoint and the torque setpoint relating to the driver assistance systems comprises selecting of includes comparing the brake pedal torque setpoint and the torque setpoint relating to the driver assistance systems and selecting a higher setpoint value.

4. A motor vehicle comprising:
    an electric or hybrid propulsion system;
    a hydraulic braking system;

an electric braking system allowing recovery of electrical energy;

a brake pedal;

vehicle driver assistance systems that generate a plurality of torque setpoints, the driver assistance systems including an adaptive speed controller that generates one of the plurality of torque setpoints;

an electronic vehicle stability control system; and an electronic control unit, wherein the electronic control unit comprises:

means for selecting one torque setpoint from between a pedal torque setpoint relating to a position of or a force exerted on the brake pedal and a torque setpoint relating to formulated from the plurality of torque setpoints of to the driver assistance systems;

means for formulating a hydraulic braking torque setpoint, independent of a state of the pedal, using the electric or hybrid propulsion system;

means for acquiring data relating to stability of the vehicle from the electronic vehicle stability control system;

means for formulating a hydraulic braking torque setpoint and an electric braking torque setpoint configured for the electric or hybrid propulsion system, on the basis of the selected torque setpoint, the independent hydraulic braking torque setpoint, and the data relating to the stability of the vehicle; and means for formulating an emergency braking setpoint, wherein the driver assistance systems are separate from the electronic vehicle stability control system and the means for formulating the emergency braking setpoint.

5. The motor vehicle as claimed in claim 4, wherein the emergency braking setpoint is configured for the electronic vehicle stability control system on the basis of the data relating to the position of or the force exerted on the brake pedal.

6. The motor vehicle as claimed in claim 4, wherein the means for selecting one torque setpoint from between the brake pedal torque setpoint and the torque setpoint relating to the driver assistance systems comprises means for comparing the brake pedal torque setpoint and the torque setpoint relating to the driver assistance systems and means for selecting a higher setpoint value.

7. The method as claimed in claim 1, wherein the selecting one torque setpoint from between the brake pedal torque setpoint and the torque setpoint relating to the driver assistance systems occurs without the data relating to stability of the vehicle and without input from the emergency braking system.

8. The motor vehicle as claimed in claim 4, wherein the means for selecting one torque setpoint from between a pedal torque setpoint relating to a position of or a force exerted on the brake pedal and a torque setpoint relating to formulated from the plurality of torque setpoints of to the driver assistance systems selects the one torque setpoint without the data relating to stability of the vehicle and without the emergency braking setpoint.

\* \* \* \* \*